A. L. & K. JOHNSON.
ACCOUNT REGISTER.
APPLICATION FILED AUG. 5, 1911.

1,021,152.

Patented Mar. 26, 1912.

2 SHEETS—SHEET 1.

Witnesses:
Adelaide Kearns
H. E. Randle

Inventors:
Archie L. Johnson,
and Kelly Johnson;
By Robert W. Randle,
Attorney.

A. L. & K. JOHNSON.
ACCOUNT REGISTER.
APPLICATION FILED AUG. 5, 1911.

1,021,152.
Patented Mar. 26, 1912.
2 SHEETS—SHEET 2.

Witnesses:
Adelaide Kearns
R. E. Randle

Inventors:
Archie L. Johnson,
& Kelly Johnson,
By Robert W. Randle,
Attorney.

UNITED STATES PATENT OFFICE.

ARCHIE L. JOHNSON AND KELLY JOHNSON, OF LOSANTVILLE, INDIANA.

ACCOUNT-REGISTER.

1,021,152.     Specification of Letters Patent.     Patented Mar. 26, 1912.

Application filed August 5, 1911. Serial No. 642,549.

*To all whom it may concern:*

Be it known that we, ARCHIE L. JOHNSON and KELLY JOHNSON, both citizens of the United States, residing at Losantville, in the county of Randolph and State of Indiana, have invented certain new and useful Improvements in Account-Registers, of which the following is a full, clear, and comprehensive specification and exposition, being such as will enable others to make and use the same with absolute exactitude.

The object of our present invention, broadly speaking, is to provide an account register which will be neat and attractive in appearance, easily operated and controlled, light in weight, compact in form, and which can be manufactured and sold at a comparatively low price.

A more specific object of our invention is to provide an account register adapted to contain a true statement of the accounts of a plurality of customers in such a compact and comprehensive arrangement that any one account will be readily accessible at any time, and by which the danger of error will be practically *nil*.

Other objects and particular advantages of our invention will be brought out and made apparent in the course of the following specification, and that which is new and useful will be correlated in the appended claims which terminate this description.

The preferred manner for the accomplishment of our invention in a practical manner and that which in practice we have determined to be the most practical and utilitarian is shown in the accompanying drawings, in which—

Figure 1:
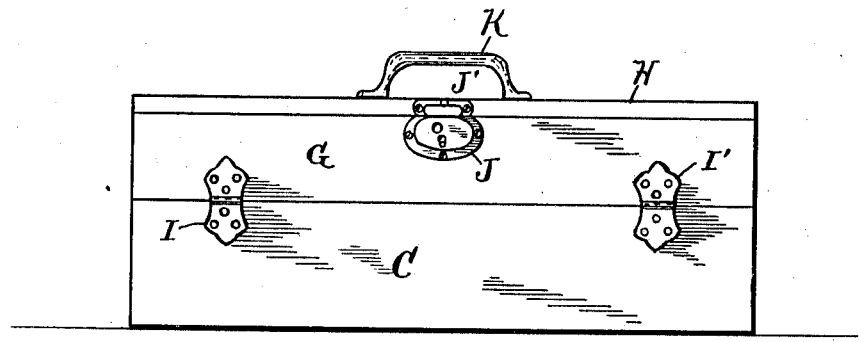
Figure 2:
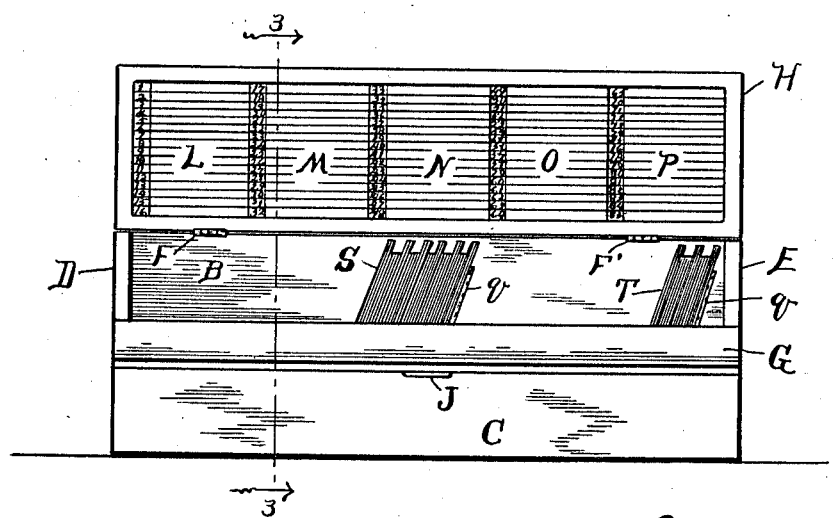
Figure 3:
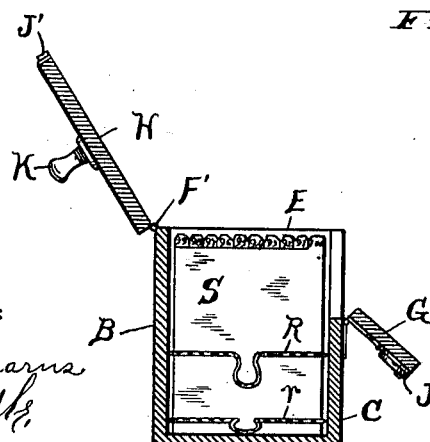
Figure 4:
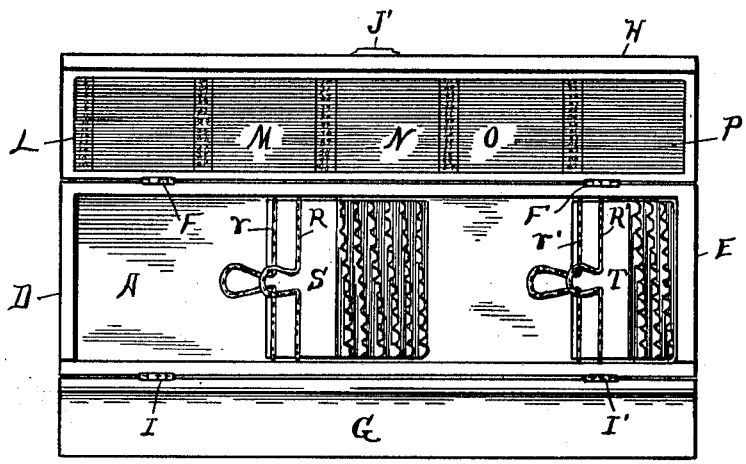
Figure 5:
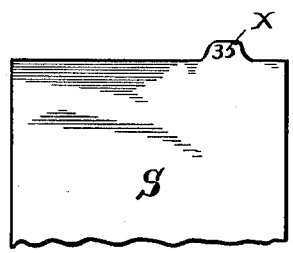
Figure 6:
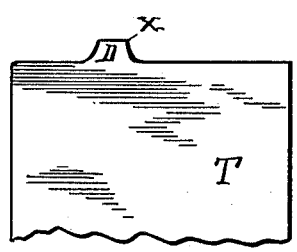
Figure 7:
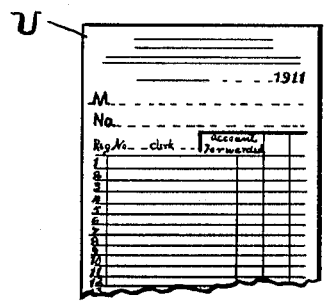
Figure 8:
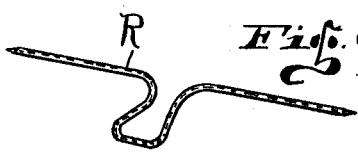
Figure 9:
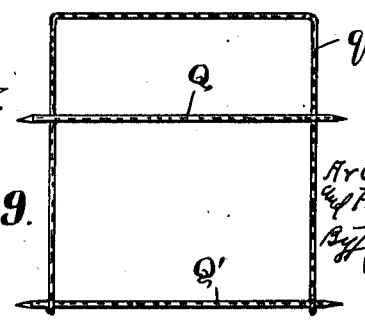

Figure 1 is a side elevation of our register closed and adapted to be carried by one's hand. Fig. 2 is a front elevation of the register opened. Fig. 3 is a cross sectional view of the register open, and as taken on line 3—3 of Fig. 2. Fig. 4 is a plan view of the interior of the register open. Fig. 5 is a detail view showing a fragment of one of the numerical markers or cards. Fig. 6 is a detail view showing a fragment of one of the alphabetical markers or cards. Fig. 7 is a detail view showing a portion of one of the itemizing leaves for accounts. Fig. 8 is a detail view of one of the spring retaining keys. And Fig. 9 shows one of the supporting frames, which frames are identical with each other.

Similar indices denote like parts throughout the several views.

In order that the construction and the operation of our invention may be more fully understood and appreciated we will now take up a description thereof in concrete detail in which we will set forth the invention as briefly and as comprehensively as we may.

The body or case of our invention comprises a box-like inclosure including the bottom A, the back B, the permanent front C, which extends up only slightly more than one-half the height of the body B; and the ends D and E, which are as wide as the bottom A and extend up even with the back B; all of said parts being rigidly connected or formed integral with each other. Connected to the upper edge of the front C, by the hinges I and I', is the leaf G which is adapted to turn down as in Fig. 3, but when it is folded up it extends even with the upper edge of the back B. Adapted to cover the top of the case is the lid H which is connected by the hinges F and F' to the upper edge of the back B. When the case thus formed is closed then the forward edge of the lid H and the upper edge of the leaf G are adapted to be locked together by a lock, one member thereof being secured to the leaf G and denoted by letter J, and member J' thereof being secured to the edge of the lid H, all substantially as shown. The inclosure thus formed is adapted to be carried by the handle K which is secured in the center of the lid H as shown.

Disposed on the inside face of the lid H is a series of columns L, M, N, O and P for instance, and each of said columns is subdivided by lines into a plurality of spaces each of which is given a distinctive number or caption, as indicated. The name of a permanent customer may be inserted in one of said spaces and the number in that space will of course be the number by which that customer will be known.

Located near the center of the space within the case is a wire frame, as shown in Fig. 9, which is made up of two comparatively heavy cross wires Q and Q', and the single length of lighter wire $c$ which connects the cross-wires and with its central portion parallel therewith, as shown. Said frame is retained in position by reason of the ends of the cross-wires Q and Q' being inserted at one end in the back B and at the other end in the front C, whereby the frame is held rigid and it should be located at an angle sloping to the right as indicated in Fig. 2. Another such frame, made identical with the one just described, is located near the end E, as indicated in Fig. 2, and it is secured in place in the same manner.

A plurality of spring retaining keys R, R', $r$ and $r'$ are provided, all being formed identical with each other and with that shown in Fig. 8, each consisting of a single length of wire having its termini pointed, the central portion thereof being formed in a loop in such manner that the termini may be sprung nearer together by simply pressing the sides of loop toward each other, in order to release the key from the case.

A plurality of cards S are provided, there being the same number as there are numerals or spaces on the lid H. Each of said cards S has an extending tag $x$ on its upper edge, on the face of which is a number, as shown in Fig. 5. Said tags are arranged staggered with relation to each other in order that the numbers thereon may be more easily seen when the cards are placed together. For instance if there are one hundred numbers on the lid H then there should be one hundred of said cards. These cards should be made into a single bunch and placed on end, resting on the bottom A and leaning against the central frame above referred to, which will place the cards in the position shown in Fig. 2, the faces of the cards being to the left.

The clip $r$ should now be placed near the bunch of cards with its ends inserted in the front and back as stated. Also the clip R should be placed as in Fig. 3, but it should at this time be located some distance from the cards S in order that the cards may be moved to the left at the top resting or leaning against the key R in place of against the central frame as shown. Also a plurality of cards T is provided, being the same in number as the number of letters in the alphabet; each of said cards T has an upwardly extending tag $x$ on its upper edge, on the face of which is a letter, each letter being different from the others. All of the twenty-six cards T may be formed into a single bunch and placed on end resting on the bottom A and leaning against the right-hand frame above referred to, which will place them in the position shown in Fig. 2, the faces of the cards T also face the left as indicated. The clip $r'$ should then be placed near the bunch of cards last named with the ends of the clip secured in the front and back as stated. Also the clip R' should be brought to position but located some distance from the cards T in order that the cards T may be moved to the left at their upper ends and resting against the key R' in place of the frame stated.

In connection with the above there should be a tablet or the like composed of a plurality of leaves U which contain thereon a place for the date, name of customer, spaces for list of articles purchased and the amount and space for the amount forwarded from prior sales.

As above set forth the register is in position for use, the various customers' names being entered in the numbered spaces on the lid. Suppose now that a customer enters and makes a purchase, the various items will be entered on the leaf U, making same time a carbon copy thereof. The attendant will then open the register, as in Fig. 3, finding the customer's name entered on the lid, he will then glance over the cards S until he finds the numeral corresponding to the number opposite the name of the customer as shown on the lid, he will then place one of the leaves or slips U, containing the items just sold, in front of that card containing the number of that customer, giving the duplicate slip U to the customer. Or if upon looking back of the card containing the number of the customer other slips are found, then he will take the last one, ascertain the amount carried forward and add that to the amount of the bill just sold and enter the total on the bill just sold after the caption "Account forwarded." By the above it will be seen that the last slip or bill sold will always show the total amount of the indebtedness of any particular customer. Should the customer, however, be transient or without an open account then his name will not be found upon the lid, but his account may be kept under the alphabetical list at the right, which is used in exactly the same way as the numerical list, except that all of such accounts whose names begin with the same letter are kept together. Suppose now that a customer desires to pay his account, the attendant first goes over the list of names on the lid to find the number of that customer, whose number may be found to be "35" for instance; he then turns to card thirty-five, back of which he will find all of the slips containing the total sales to that customer since last settlement, the upper slip of course showing at a glance the total amount of the indebtedness of that customer, while if the account be questioned it may be examined in detail by looking over the various slips. If the customer pays the account then all of the slips or leaves are handed to him and his space will be left clear. If the customer should make a partial payment then the amount paid may be entered on a new leaf or slip, subtracting this amount of payment from the total of the bills, as shown by "Account forwarded," and then enter the remainder after the caption "Account forwarded" on the new slip. The same manner of operation of course applies to the alphabetical list. As the various accounts fill up or have more slips it may be necessary to move the clips or keys, from time to time, they being adapted to hold at any point where they are released. Now at the close of business the clips or keys R and R' (and perhaps the keys or clips $r$ and $r'$) may be placed tightly against the cards, which will prevent the cards and slips from getting out of position, holding them tightly in place. The leaf G and the lid H are then closed, after which the case may be locked and taken to a place of safety.

We desire that it be understood that various changes may be made in the several details of construction, from those herein shown and described, without departing from the spirit of our invention or sacrificing any of the principles thereof.

Having now fully shown and described our invention and one manner for the utilization thereof, what we claim and desire to secure by Letters Patent of the United States, is—

1. An account register including a case, a series of cards numbered from one progressively, a series of spaces located on the inside of the lid and numbered from one progressively, a series of cards lettered from A progressively through the alphabet, an angularly disposed frame forming a back for the numbered cards, an angularly disposed frame forming a back for the lettered cards, spring clips adapted to be adjustably secured within the case for holding the numbered cards, spring clips adapted to be adjustably secured within the case for holding the lettered cards, and account slips adapted to be placed between the numbered cards and between the lettered cards, all substantially as shown and described.

2. In an account register, the combination with a box-like inclosure having a lid, a plurality of cards S adapted to be located in said inclosure and each card having a distinctive number thereon, lines dividing the inner face of the lid into spaces and each space having a number corresponding to one of the numbers on said cards, the cards T also located in said inclosure and each having a distinctive letter thereof, a frame located across in the central portion of said inclosure and dividing the two sets of cards from each other, and a plurality of spring retaining keys adapted to be adjustably located across inside the inclosure, all substantially as shown and described and for the purposes set forth.

In testimony whereof we have hereunto subscribed our names to this specification in the presence of two subscribing witnesses.

ARCHIE L. JOHNSON.
KELLY JOHNSON.

Witnesses:
R. W. RANDLE,
R. E. RANDLE.

---

Copies of this patent may be obtained for five cents each, by addressing the "Commissioner of Patents, Washington, D. C."